(12) United States Patent
Lamb

(10) Patent No.: US 10,344,776 B2
(45) Date of Patent: Jul. 9, 2019

(54) VIBRATION ISOLATION MOUNT

(71) Applicant: Dyson Technology Limited, Wiltshire (GB)

(72) Inventor: James Hope Lamb, Bath (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 436 days.

(21) Appl. No.: 14/268,824

(22) Filed: May 2, 2014

(65) Prior Publication Data
US 2014/0328670 A1   Nov. 6, 2014

(30) Foreign Application Priority Data

May 3, 2013   (GB) .................................. 1308089.0

(51) Int. Cl.
| F04D 29/66 | (2006.01) |
| A47L 9/00 | (2006.01) |
| A47L 5/24 | (2006.01) |
| H02K 5/24 | (2006.01) |
| A47L 9/22 | (2006.01) |
| F04D 29/16 | (2006.01) |
| F04D 29/58 | (2006.01) |
| F04D 25/06 | (2006.01) |
| H02K 9/06 | (2006.01) |

(52) U.S. Cl.
CPC .............. *F04D 29/668* (2013.01); *A47L 5/24* (2013.01); *A47L 9/0081* (2013.01); *A47L 9/22* (2013.01); *F04D 25/06* (2013.01); *F04D 29/162* (2013.01); *F04D 29/5806* (2013.01); *F04D 29/5813* (2013.01); *H02K 5/24* (2013.01); *H02K 9/06* (2013.01)

(58) Field of Classification Search
CPC ...... F04D 29/668; F04D 25/06; F04D 29/162; F04D 29/5806; F04D 29/5813; A47L 9/0081; A47L 5/24; A47L 9/22; H02K 5/24; H02K 9/06
USPC .......................... 415/119; 248/634; 267/141
See application file for complete search history.

(56) References Cited

U.S. PATENT DOCUMENTS

| 5,448,794 A | 9/1995 | Walch et al. |
| 5,632,562 A | 5/1997 | Kidzun et al. |
| 5,660,256 A | 8/1997 | Gallmeyer et al. |

(Continued)

FOREIGN PATENT DOCUMENTS

| DE | 1 125 603 | 3/1962 |
| DE | 196 20 960 | 8/1997 |

(Continued)

OTHER PUBLICATIONS

Lamb, U.S. Office Action dated Oct. 8, 2015, directed to U.S. Appl. No. 14/046,310; 27 pages.

(Continued)

*Primary Examiner* — Hoang M Nguyen
(74) *Attorney, Agent, or Firm* — Morrison & Foerster LLP

(57) ABSTRACT

A vibration isolation mount for a compressor that is formed of an elastomeric material and includes a sleeve, tapered studs or axial ribs spaced around the sleeve, and a lip seal extending around the sleeve. The mount is intended to be located between a compressor and a housing. The studs or ribs then deform to isolate the housing from radial vibration of the compressor, and the lip seal creates an annular seal between the housing and the compressor.

5 Claims, 4 Drawing Sheets

(56) References Cited

U.S. PATENT DOCUMENTS

| | | | |
|---|---|---|---|
| 5,875,562 A | 3/1999 | Fogarty | |
| 6,021,993 A | 2/2000 | Kirkwood | |
| 6,045,112 A | 4/2000 | Kirkwood | |
| 7,243,894 B2 | 7/2007 | Haregoppa et al. | |
| 8,397,344 B2* | 3/2013 | Liddell | A47L 5/24 15/326 |
| 2002/0138941 A1* | 10/2002 | Paterson | A47L 5/28 15/412 |
| 2004/0021393 A1 | 2/2004 | Suzuki et al. | |
| 2006/0260091 A1* | 11/2006 | Song | A47L 9/22 15/326 |
| 2007/0080593 A1 | 4/2007 | O'Donnell | |
| 2010/0215500 A1* | 8/2010 | Jones | F04D 29/263 416/204 A |
| 2010/0223751 A1 | 9/2010 | Liddell | |
| 2014/0035413 A1 | 2/2014 | Cowdry | |
| 2014/0097323 A1 | 4/2014 | Lamb | |

FOREIGN PATENT DOCUMENTS

| | | |
|---|---|---|
| DE | 20 2006 012 489 | 1/2008 |
| EP | 0 272 851 | 6/1988 |
| EP | 0 558 110 | 9/1993 |
| EP | 0 806 830 | 11/1997 |
| EP | 2 466 147 | 6/2012 |
| EP | 2 510 861 | 10/2012 |
| FR | 1255721 | 3/1961 |
| GB | 953057 | 3/1964 |
| GB | 2 295 056 | 5/1996 |
| GB | 2513662 | 11/2014 |
| GB | 2513663 | 11/2014 |
| GB | 2513664 | 11/2014 |
| JP | 51-69711 | 6/1976 |
| JP | 54-84507 | 6/1979 |
| JP | 54-95813 | 7/1979 |
| JP | 63-39439 | 2/1988 |
| JP | 6-82451 | 11/1994 |
| JP | 9-203192 | 8/1997 |
| JP | 2001-25204 | 1/2001 |
| JP | 2004-113944 | 4/2004 |
| NL | 250950 | 2/1964 |
| WO | WO-00/48293 | 8/2000 |
| WO | WO-03/058795 | 7/2003 |
| WO | WO-2011/009784 | 1/2011 |

OTHER PUBLICATIONS

Search Report dated Nov. 13, 2013, directed to GB Application No. 1308089.0; 1 page.

International Search Report and Written Opinion dated Jul. 24, 2014, directed to International Application No. PCT/GB2014/051290; 11 pages.

Lamb, U.S. Office Action dated Jul. 13, 2016, directed to U.S. Appl. No. 14/046,310; 27 pages.

Lamb, U.S. Office Action dated Apr. 20, 2017, directed to U.S. Appl. No. 14/046,310; 24 pages.

Lamb, U.S. Office Action dated Oct. 25, 2017, directed to U.S. Appl. No. 14/046,310; 23 pages.

Lamb, U.S. Office Action dated Apr. 6, 2018, directed to U.S. Appl. No. 14/046,310; 24 pages.

* cited by examiner

VIBRATION ISOLATION MOUNT

REFERENCE TO RELATED APPLICATION

This application claims priority of United Kingdom Application No. 1308089.0, filed May 3, 2013, the entire contents of which are incorporated herein by reference.

FIELD OF THE INVENTION

The present invention relates to a vibration isolation mount for a compressor.

BACKGROUND OF THE INVENTION

A compressor may be mounted within a housing by o-rings that surround the compressor. During operation of the compressor, the o-rings deform to isolate the housing from vibration of the compressor. In addition, the o-rings create a seal between the compressor and the housing. A problem with this arrangement is that, relatively speaking, the housing is poorly isolated from the compressor. That is to say that a significant amount of vibration generated by the compressor continues to be transmitted to the housing.

SUMMARY OF THE INVENTION

The present invention provides a vibration isolation mount for a compressor, the mount being formed of an elastomeric material and comprising a sleeve, a plurality of tapered studs or axial ribs spaced around the sleeve, and a lip seal extending around the sleeve.

The mount is intended to be located between a compressor and a housing. The studs or ribs then deform to isolate the housing from radial vibration of the compressor, and the lip seal creates an annular seal between the housing and the compressor. By employing studs or ribs, contact between the mount and the housing may be made over a smaller area in comparison to, say, a plurality of o-rings. As a result, the mount provides improved isolation whilst continuing to provide a seal between the compressor and the housing.

The compressor may be mounted within a cylindrical recess within the housing. The provision of studs or axial ribs makes it easier to insert the compressor and mount into the recess. In contrast, if o-rings were employed, the friction generated between the o-rings and the housing would make it difficult to insert the compressor into the recess.

Although the lip seal contacts the housing over a relatively large area, the lip seal is intended only to create a seal between the compressor and the housing and is not intended to absorb radial vibration of the compressor. Consequently, the lip seal may be configured such that the seal provides a relatively poor transmission path for radial vibration of the compressor. In particular, the radial compliance of the seal may be greater than that of the studs or ribs. Consequently, radial vibration of the compressor relative to the housing is opposed by the studs or ribs rather than the lip seal.

The seal may be located at one end of the sleeve. This then has the benefit that the studs or ribs may be isolated from the fluid path. As a result, fluid flowing between the housing and the compressor is not impeded by the studs or ribs. Additionally, by locating the seal at one end of the sleeve, the seal may be formed with a free end (i.e. one not attached to the sleeve). This then has the advantage that seal may be sized such that a good seal is consistently formed between the housing and the compressor, whilst ensuring that a relatively high compliance is achieved for the seal such that the seal presents a relatively poor transmission path for radial vibration of the compressor.

The present invention also provides a product comprising a compressor, a housing, and a vibration isolation mount as claimed in any one of the preceding claims, wherein the mount is located between the compressor and the housing, the studs or ribs deform to isolate the housing from radial vibration of the compressor, and the lip seal creates an annular seal between the housing and the compressor.

The compressor may comprise an axial inlet through which fluid enters the compressor and a radial outlet through which fluid exits the compressor. Moreover, the inlet may be located at one end of the compressor, and the annular seal may be created at a position between the outlet and the opposite end of the compressor. The seal of the mount may be used to return the fluid back into the compressor, e.g. to cool components of the compressor. For example, the compressor may comprise a further inlet located between the radial outlet and the opposite end of the compressor. The lip seal then creates the annular seal at a position between the radial inlet and the opposite end of the compressor. Alternatively, the housing of the compressor may comprise one or more exhaust openings in a wall surrounding the compressor. The lip seal then creates the annular seal between the compressor and the wall of the housing.

The compressor may comprise a centrifugal impeller located downstream of the axial inlet and upstream of the radial outlet. By employing a radial outlet, the fluid exiting the impeller is not required to turn axially. As a result, a relatively compact compressor may be achieved. Additionally, flow losses within the compressor may be reduced.

BRIEF DESCRIPTION OF THE DRAWINGS

In order that the present invention may be more readily understood, an embodiment of the invention will now be described, by way of example, with reference to the accompanying drawings, in which.

DETAILED DESCRIPTION OF THE INVENTION

Figure 1:
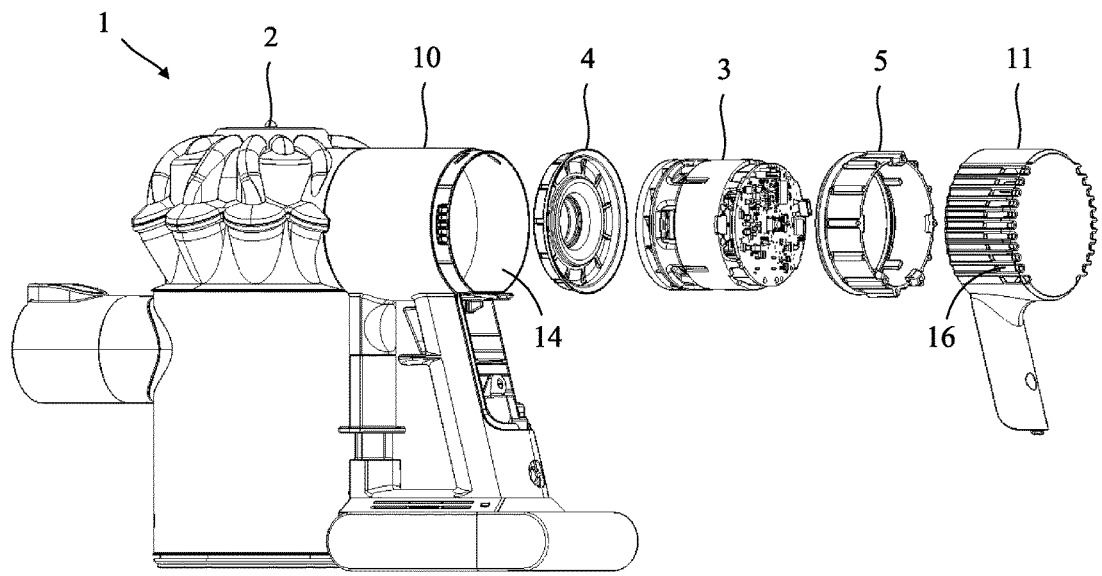
FIG. 1 is an exploded view of a product in accordance with the present invention.

The product 1 of FIG. 1 comprises a housing 2, a compressor 3, an axial mount 4 and a radial mount 5. Each of the mounts 4,5 is located between the housing 2 and the compressor 3 and acts to isolate the housing 2 from vibration generated by the compressor 3. In this particular example, the product 1 is a handheld vacuum cleaner.

Figure 3:
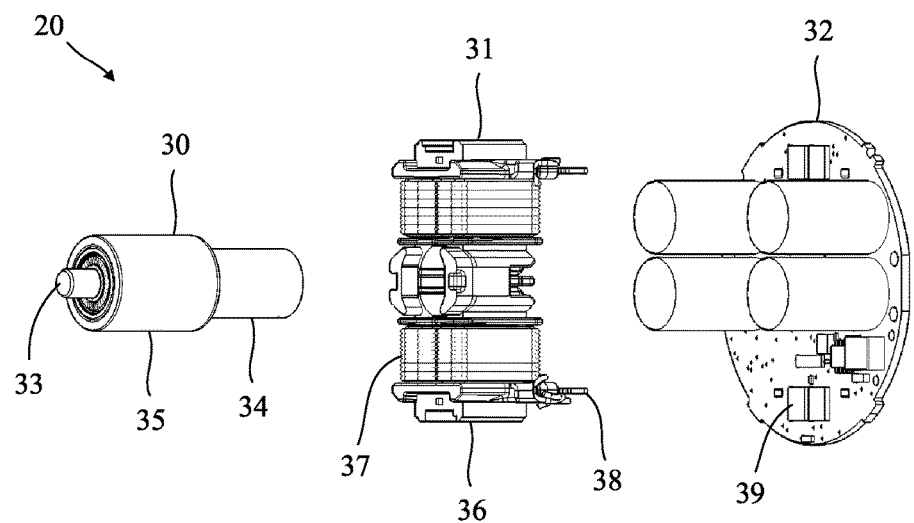
FIG. 3 is an exploded view of the motor of the compressor.
Figure 2:
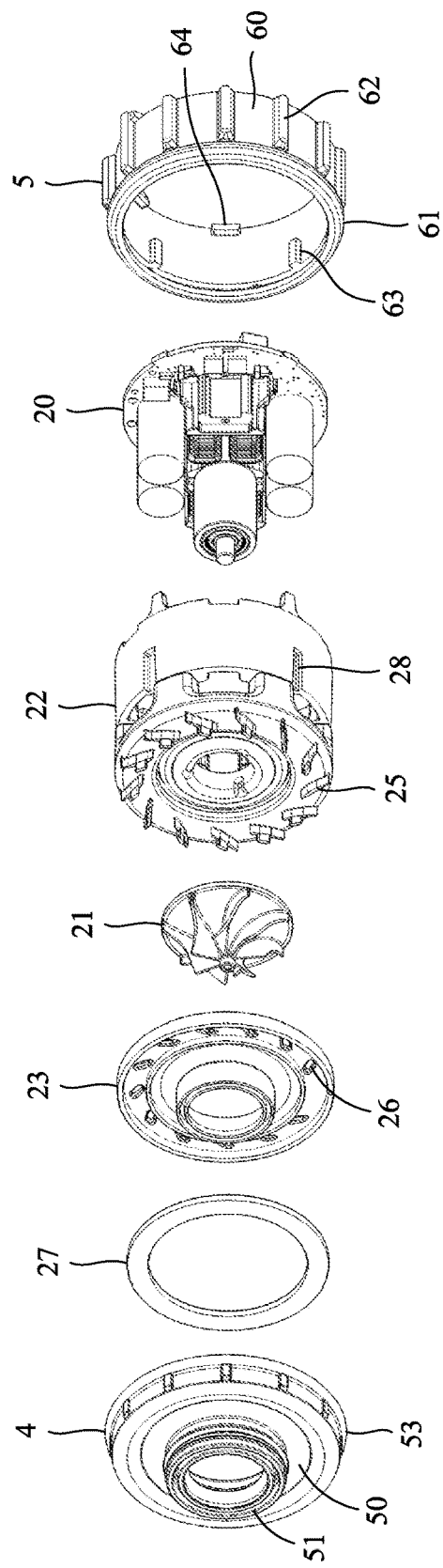
FIG. 2 is an exploded view of the compressor and vibration isolation mounts of the product.
Figure 4:
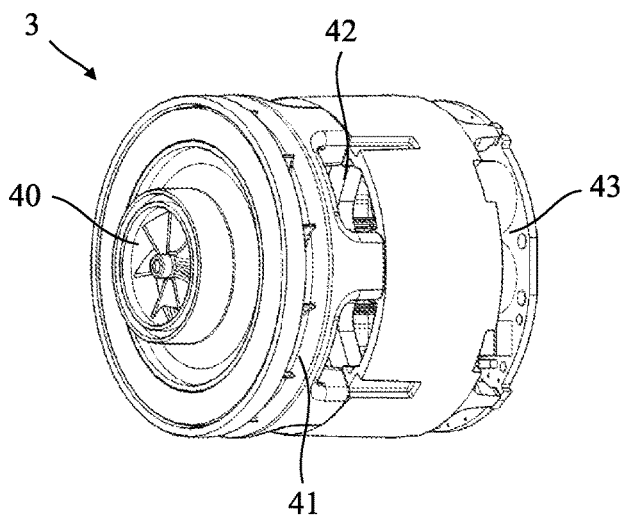
FIG. 4 is an axonometric view of the compressor.

Referring now to FIGS. 2 and 3, the compressor 3 comprises an electric motor 20, an impeller 21, a frame 22 and a shroud 23.

The motor 20 comprises a rotor assembly 30, a stator assembly 31 and a circuit assembly 32. The rotor assembly 30 comprises a shaft 34 to which a rotor core 35 and a bearing assembly 36 are attached. The stator assembly 31 comprises a pair of stator cores 37 around which electrical windings 38 are wound. The windings 38 are connected to the circuit assembly 32 via terminal connectors, which also act to secure the circuit assembly 32 to the stator assembly 31. The rotor assembly 30 and the stator assembly 31 are each secured to the frame 22, with the rotor assembly 30 being secured to the frame 22 by means of the bearing assembly 36.

The impeller 21 is a centrifugal impeller and is secured to the shaft 34 of the motor 20.

The shroud 23 overlies the impeller 21 and one end of the frame 22. The shroud 23 and the frame 22 extend radially beyond the impeller 21 and define a diffuser 24 that surrounds the impeller 21. The frame 22 includes a plurality of diffuser vanes 25 that extend through holes 26 in the shroud 23. A ring of adhesive 27 then secures the shroud 23 to the vanes 25 and seals the holes 26.

The compressor 3 comprises a first inlet 40 located upstream of the impeller 21, a first outlet 41 located downstream of the impeller 21, a second inlet 42 located downstream of the first outlet 41, and a second outlet 43 located downstream of the second inlet 42.

The first inlet 40 corresponds to the inlet in the shroud 23 and comprises a circular aperture located at the centre of the shroud 23. The first outlet 41 comprises an annular aperture that is defined by the axial gap that exists between the frame 22 and the shroud 23 at the periphery. The first outlet 41 therefore surrounds the diffuser 24. Indeed, the first outlet 41 may be regarded as the outlet of the diffuser 24. The second inlet 42 is located below the first outlet 41 and comprises a plurality of apertures that are formed around the frame 22. The second outlet 43 likewise comprises a plurality of apertures that are defined between the end of the frame 22 and the circuit assembly 32.

The axial mount 4 is formed of an elastomeric material such as natural or synthetic rubber (e.g. EPDM). The axial mount 4 is similar in shape to that of the shroud 23 and comprises a disk-shaped portion 50 and a cylindrical portion 51 that extends upwardly from the disk-shaped portion 50. The cylindrical portion 51 includes a lip seal 52 that extends around the outside of the cylindrical portion 51. The disk-shaped portion 50 includes a downwardly-projecting rim 53. Moreover, the free end of the rim 53 flares outward slightly to define a curved lip 54. As explained below, this lip 54 helps to direct fluid exiting the first outlet 41 towards the second inlet 42. The axial mount 4 attaches to the shroud 23 of the compressor 3. More specifically, the cylindrical portion 51 seals against the shroud inlet 40 and the rim 53 stretches over and forms an interference fit with the perimeter of the shroud 23.

The radial mount 5 is likewise formed of an elastomeric material and comprises a sleeve 60, a lip seal 61, a plurality of ribs 62, a plurality of locking stubs 63, and a plurality of end stubs 64. The lip seal 61 is located at and extends around one end of the sleeve 60. The ribs 62 are spaced around the outside of the sleeve 60 and extend axially along the length of the sleeve 60. The locking stubs 63 are rectangular in shape and are spaced around the inside of the sleeve 60. The end stubs 64 extend beyond the opposite end of the sleeve 60. Additionally, the end stubs 64 project radially inward from the sleeve 60.

The radial mount 5 attaches to the frame 22 of the compressor 3. The sleeve 60 stretches over and forms an interference fit with the frame 22. The locking stubs 63 then engage with corresponding recesses 28 formed around the outside of the frame 22, whilst the end stubs 64 engage with the free end of the frame 22. The locking stubs 63 act to align the compressor 3 and the radial mount 5. The locking stubs 63 also act to prevent the compressor 3 from rotating relative to the radial mount 5, whilst the locking stubs 63 and end stubs 64 act to prevent the compressor 3 from moving axially relative to the radial mount 5. Consequently, when inserting the compressor 3 and mounts 4,5 into the housing 2, the compressor 3 does not move relative to the mounts 4,5.

The housing 3 comprises a front section 10 and a rear section 11. The front section 10 comprises an end wall 12 and a side wall 13 that define a generally cylindrical recess 14 within which the compressor 3 and the mounts 4,5 are located. The axial mount 4 abuts the end wall 12, and the lip seal 52 seals against the end wall 12. The radial mount 5 abuts the side wall 13. Moreover, the lip seal 61 seals against the side wall 13, and the ribs 62 are crushed slightly by the side wall 13. The rear section 7 attaches to the front section 6 so as to close the recess 14. The rear section 7 comprises a number of flanges (not shown) that abut the end stubs 64 of the radial mount 5. The compressor 3 and mounts 4,5 are thus restrained axially by the end wall 12 of the front section 6 and the flanges of the rear section 7, and are restrained radially by the side wall 13 of the front section 6. The end wall 12 of the front section 6 includes an inlet aperture 15 through which fluid enters compressor 3, and the rear section 7 comprises a plurality of exhaust apertures 16 through which fluid from the compressor 3 is exhausted.

The lip seal 52 of the axial mount 4 creates a seal between the housing 2 and the compressor 3 at a position between the first inlet 40 and the first outlet 41, whilst the lip seal 61 of the radial mount 5 creates a seal between the housing 2 and the compressor 3 at a position between the second inlet 42 and the second outlet 43. The two seals 52,61, the housing 2 and the compressor 3 collectively delimit a chamber 44 that is open to the first outlet 41 and the second inlet 42, and is closed to the first inlet 40 and the second outlet 43.

During operation, fluid enters the compressor 3 via the first inlet 40. The fluid is centrifuged outwards by the impeller 21, flows through the diffuser 22 and exits the compressor 3 via the first outlet 41. On exiting the compressor 3, the fluid enters the chamber 44 delimited by the seals 52,61. Since the chamber 44 is open only to the first outlet 41 and the second inlet 42, the fluid re-enters the compressor 3 via the second inlet 42. The fluid then passes through the interior of the compressor 3 and exits the compressor 3 via the second outlet 43.

The second inlet 42 is located upstream and the second outlet 43 is located downstream of various components of the motor 20, e.g. the bearing assembly 36, the rotor core 35, the stator assembly 31 and the circuit assembly 32. Consequently, as fluid flows between the second inlet 42 and the second outlet 43, the fluid acts to cool these components.

A conventional compressor may be configured such that fluid exiting the impeller is returned through the interior of the compressor so as to cool components of the motor. However, the fluid is typically returned by the outer casing of the compressor, which includes one or more bends for turning the fluid that exits the impeller. As a result, the overall size of the compressor is increased. Rather than using the casing of the compressor, the housing 2 and the mounts 4,5 are instead used to return the fluid back into the interior of the compressor 3. As a result, a more compact arrangement may be achieved.

Owing to the locations of the first inlet 40 and the first outlet 41, fluid enters the compressor 3 in an axial direction (i.e. in a direction parallel to the axis of rotation of the impeller 21) and exits in a radial direction (i.e. in a direction normal to the axis of rotation). Moreover, a linear path is established between the outlet of the impeller 21 and the first outlet 41. Fluid exiting the impeller 21 is not therefore required to turn axially within the compressor 3 before exiting via the first outlet 41. As a result, a more compact arrangement may be achieved. Additionally, flow losses within the compressor 3 may be reduced.

The first outlet 41 comprises an annular opening that surrounds or forms the exit of the diffuser 24. This then has the advantage that the height of the first outlet 41 may be kept relatively low whilst maintaining a relatively large surface area for the outlet 41. Consequently, a relatively compact compressor 3 may be achieved without the first outlet 41 creating a restriction or otherwise impeding the fluid flow. Additionally, since the first outlet 41 is annular, fluid exiting the compressor 3 via the outlet 41 further diffuses as the fluid expands into the chamber 44 between the housing 2 and the compressor 3. Conceivably, the diffuser 24 may be omitted and the first outlet 41 may form the outlet of the impeller 21. This could then lead to a more compact arrangement at the expense of increased flow losses.

The axial mount 4 includes a curved lip 54 located at the first outlet 41 of the compressor 3. The curved lip 54 acts to turn the fluid exiting the first outlet 41 in a direction towards the second inlet 42. Since the lip 54 is curved, the fluid follows a smoother path between the first outlet 41 and the second inlet 42, thus reducing flow losses.

The windings 38 of the stator assembly 31 and the power switches 39 of the circuit assembly 32, which are used to control the flow of current through the windings 38, typically generate high levels of heat owing to the magnitude of the currents carried by them. The second inlet 42 and the second outlet 43 are located such that the fluid flowing through the interior of the compressor 3 acts to cool the windings 38 and the power switches 39. This then has the advantage that the windings 38 and the power switches 39 are able to carry higher currents and thus the motor 20 is able to operate at higher electrical power.

Figure 5:
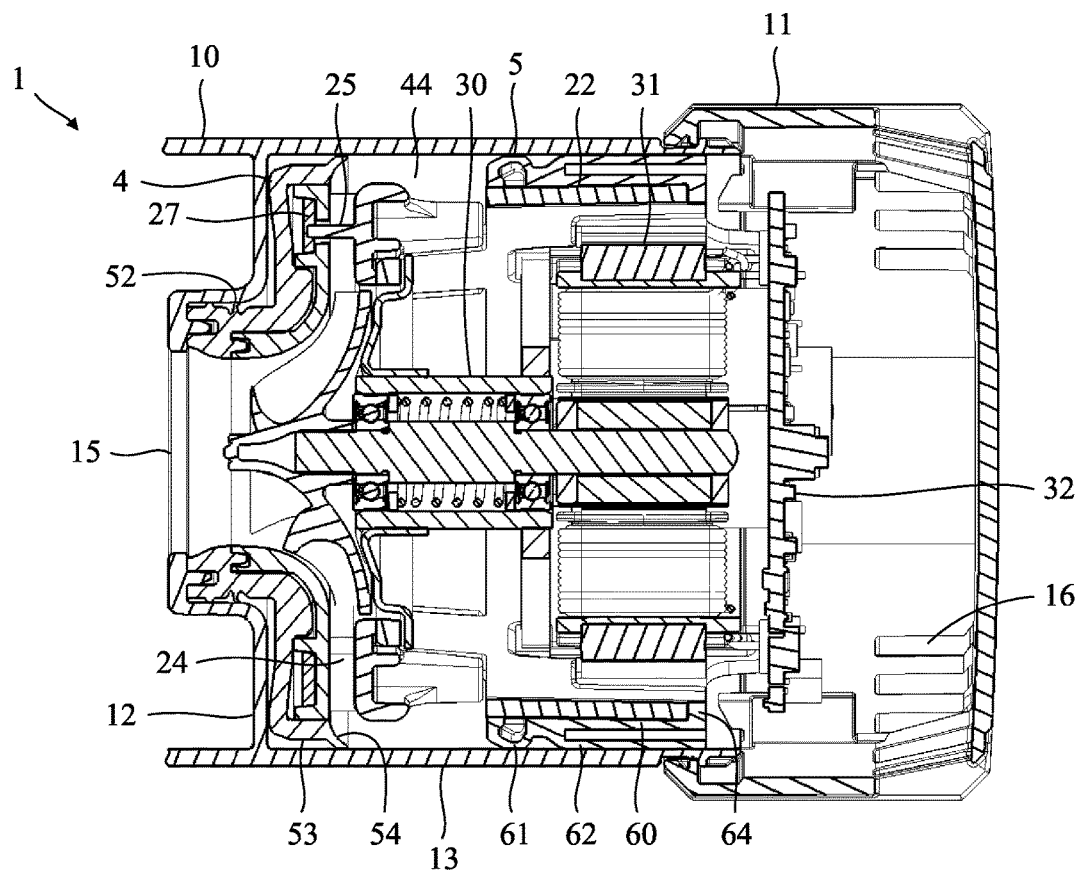
FIG. 5 is a sectional view through the compressor, the vibration isolation mounts and part of the housing of the product.
Figure 6:
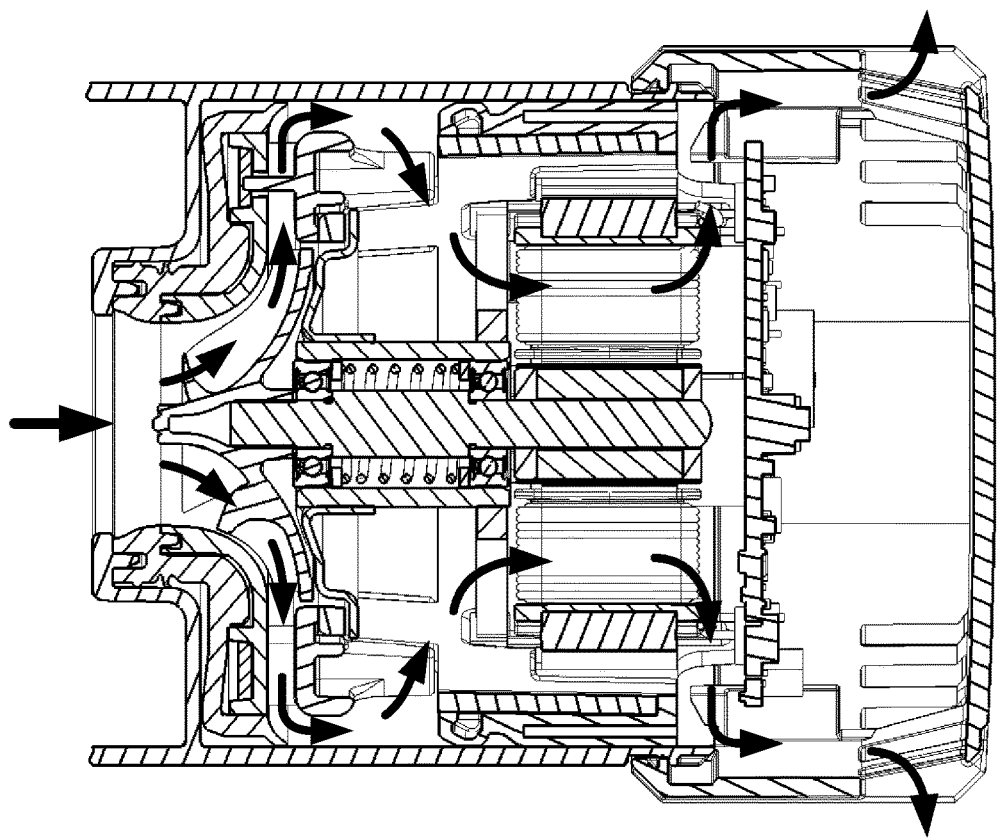
FIG. 6 is the same sectional view as that of FIG. 5 highlighting the path taken by fluid flowing through the product.

In the embodiment described above, the radial mount 4 forms a seal between the housing 2 and the compressor 3 such that all of the fluid exiting the compressor 3 via the first outlet 41 is caused to re-enter the compressor 3 via the second inlet 42. This then has the advantage of maximising cooling since all of the available fluid is returned through the interior of the compressor 3. However, it may not be necessary to return all of the fluid exiting the first outlet 41 through the interior of the compressor 3 in order to achieve the necessary cooling. Moreover, improved performance (e.g. mass flow rate or efficiency) may be achieved by returning only a portion of the fluid through the interior of the compressor 3. Accordingly, rather than forming a seal between the housing 2 and the compressor 3, the radial mount 4 may instead form a partial seal. The partial seal may take the form of a lip or rim that contacts and seals against the housing 2 around only a part of the compressor 3. Alternatively, the partial seal may take the form of a rim or flange(s) that extend radially toward the housing 2 but do not necessarily contact the housing 2. Accordingly, in a more general sense, the radial mount 4 may be said to create a restriction (seal or partial seal) between the housing 2 and the compressor 3 that causes fluid exiting the first outlet 41 to re-enter the compressor 3 via the second inlet 42. Where a partial seal is created between the housing 2 and the compressor 3, part of the fluid exiting the first outlet 41 re-enters the compressor 3 via the second inlet 42 and part of the fluid bypasses the second inlet 42. For example, in the embodiment illustrated in FIGS. 5 and 6, fluid bypassing the second inlet 42 would flow axially between the housing 2 and the compressor 3 and exit the product 1 via the exhaust openings 16. Since this bypass fluid is not required to turn or collide with components of the motor 20, improved performance may be achieved.

In the embodiment described above, the product 1 comprises two distinct mounts 4,5 for isolating the housing 2 from axial and radial vibration of the compressor 3. This then has the advantage that the two mounts 4,5 may be moulded or otherwise formed with features that would otherwise be difficult to achieve with a single mount. Additionally, if required, materials having different physical properties may be used for the two mounts 4,5. For example, the two mounts 4,5 may be formed of materials having different Shore hardness such that each mount 4,5 has a resilience better suited to the particular vibrations that the mount 4,5 is intended to isolate. In spite of the aforementioned advantages, a single mount may instead be used to isolate the housing 2 from both axial and radial vibration. Indeed, a single mount is likely to simplify the assembly of the product 1.

The radial mount 5 comprises ribs 62 that extend axially along the length of the sleeve 60. Conceivably, rather than extending axially, the ribs 62 may extend circumferentially around the sleeve 60. This would then avoid the need for a separate lip seal 61 since the ribs would create the necessary seal between the housing 2 and the compressor 3. However, a disadvantage with this arrangement is that the circumference of the sleeve 60 is greater than the length of the sleeve 60. As a result, circumferential ribs are likely to contact the housing 2 over a greater surface area and thus transmit more of the vibration from the compressor 3 to the housing 2. Axial ribs 62 have the further advantage that, when inserting the compressor 3 and the mounts 4,5 axially into the recess 14, the ribs 62 are crushed radially and thus the radial compliance of the ribs 62 is relatively well controlled. In contrast, if the ribs 62 were to extend circumferentially around the sleeve 60, the ribs would most likely be pulled axially rather than be crushed radially as the compressor 3 and the mounts 4,5 are inserted into the recess 14. This may then adversely affect the radial compliance of the ribs and thus the efficacy of the ribs to absorb and isolate radial vibration. As an alternative to ribs 62, the radial mount 5 may comprise tapered studs (e.g. conical studs) located around the outside of the sleeve 60. By employing tapered studs, it may be possible to mount the compressor 3 within the housing 2 over fewer points of contact, thus potentially leading to better isolation. However, a potential problem with this arrangement again arises when inserting the compressor 3 and the mounts 4,5 axially into the recess 14. For example, the studs will most likely be pulled axially rather than crushed radially during insertion and thus control over the radial compliance of the studs may be relatively poor. This problem may be addressed by dividing the first section 10 of the housing 2 into a number of parts (e.g. two semi-cylindrical parts) that are brought together to enclose the compressor 3 and mounts 4,5.

The lip seal 61 of the radial mount 5 is intended only to create a seal between the housing 2 and the compressor 3. The lip seal 61 is not intended to absorb radial vibration of the compressor 3. Consequently, the lip seal 61 is configured such that the seal provides a poor transmission path for vibration of the compressor 3. In particular, the radial compliance of the lip seal 61 is greater than that of the axial ribs 62 or the tapered studs, if employed. As a result, radial vibration of the compressor 3 is opposed by the ribs 62 or studs rather than the lip seal 62. Consequently, in spite of the fact that lip seal 61 contacts the housing 2 over a relatively large area, the housing 2 continues to be well isolated from vibration of the compressor 3.

The radial mount 5 acts to isolate the housing 2 from radial vibration of the compressor 3, as well as to form an annular seal between the housing 2 and the compressor 3. In the embodiment described above, the seal created by the radial mount 5 ensures that fluid exiting the first outlet 41 of the compressor 3 is returned through the interior of the compressor 3 via the second inlet 42. However, the radial mount 5 may be used to mount other types of compressor within a housing, particularly where fluid exits the compressor in a radial direction. For example, if we consider the embodiment illustrated in FIG. 5, the second inlet 42 of the compressor 3 may be omitted (i.e. closed) and the exhaust openings 16 of the housing 2 may be located at a position approximately indicated by reference numeral 13. The seal created by the radial mount 5 then ensures that fluid exiting the compressor 3 is expelled from the housing 2 via the exhaust openings 16, i.e. the chamber 44 delimited by the seal 61 of the radial mount 5 is open to the first outlet 41 and the exhaust openings 16 only. In both this alternative embodiment and the embodiment described above, the compressor 3 comprises an axial inlet 40 and a radial outlet 41. The axial inlet 40 is located at one end of the compressor 3 and the radial mount 5 forms an annular seal at a position between the radial outlet 41 and the opposite end of the compressor 3.

The invention claimed is:

1. A vibration isolation mount for mounting a compressor in a housing, wherein the mount is formed of an elastomeric material and comprises a sleeve, a plurality of conical studs or axial ribs spaced around the outside of the sleeve, and a lip seal extending around the sleeve, wherein the lip seal is configured and positioned such that the lip seal is more compliant radially than the studs or the ribs so as to provide a stronger transmission path for radial vibration of the compressor relative to the lip seal, wherein the lip seal is positioned on the sleeve and is configured such that fluid flow between the housing and the compressor is not substantially impeded by the studs or axial ribs, wherein the studs or ribs are arranged to contact the housing, and wherein each of the ribs extends axially along the length of the sleeve.

2. The vibration isolation mount of claim 1, wherein the seal is located at one end of the sleeve.

3. A product comprising a compressor, a housing, and a vibration isolation mount, wherein the mount is formed of an elastomeric material and comprises a sleeve, a plurality of conical studs or axial ribs spaced around the outside of the sleeve, and a lip seal extending around the sleeve, the mount is located between the compressor and the housing, each of the ribs extends axially along the length of the sleeve, the studs or ribs are arranged to contact the housing, the studs or ribs deform to isolate the housing from radial vibration of the compressor, the lip seal is positioned on the sleeve and is configured such that fluid flow between the housing and the compressor is not substantially impeded by the studs or axial ribs, and the lip seal creates an annular seal between the housing and the compressor.

4. The product of claim 3, wherein the seal of the vibration isolation mount is located at one end of the sleeve.

5. The product of claim 3, wherein the compressor comprises an axial inlet through which fluid enters the compressor and a radial outlet through which fluid exits the compressor, the inlet is located at one end of the compressor, and the annular seal is created at a position between the outlet and the opposite end of the compressor.

* * * * *